UNITED STATES PATENT OFFICE.

HENRI RAYMOND VIDAL, OF PARIS, FRANCE.

TRIPHENYLMETHANE DYE AND PROCESS OF MAKING SAME.

SPECIFICATION forming part of Letters Patent No. 621,393, dated March 21, 1899.

Application filed December 1, 1898. Serial No. 697,992. (No specimens.)

*To all whom it may concern:*

Be it known that I, HENRI RAYMOND VIDAL, a resident of Paris, in the Republic of France, have invented a new and useful Improvement in the Manufacture of Coloring-Matters, which is fully set forth in the following specification.

This invention relates to a method of preparing new triphenylmethane dyestuffs obtained by the sulfuric condensation of tetralkyl hydrols with aromatic hydrazins without subsequent oxidation.

Diamide tetralkyl hydrols have the property, while undergoing condensation, of combining with various aromatic compounds, each as bases, phenols, and hydrocarbons, whether halogenized or nitrated, and of thus forming "leuco" bases capable of being converted into coloring-matter by being subsequently oxidized by means of dioxid of lead, chloranil, or any other suitable oxidizer.

I have found that certain aromatic hydrazins are capable in the presence of concentrated sulfuric acid of combining with hydrols and producing a new species of coloring agents fit to be used for dyeing without the aid of any oxidizer. The condensation is performed at from 60° to 70° centigrade, when in the first phase of the operation there will be observed the formation of a leuco base, the whole of which becomes rapidly transformed into coloring-matter. It should be borne in mind that the sulfuric acid does not in this instance, as might be supposed, act in the way the usual oxidizers do upon leuco bases, for if the leuco base be isolated before its transformation and oxidized by known oxidizing media it will be found that the resulting coloring-matter will be essentially different from the product obtained in the sulfuric condensing medium in the second phase. Thus phenyl hydrazin combines with a tetramethylated hydrol to form a leuco base oxidizable to a greenish-blue color, while in the second phase the whole of this leuco base becomes converted in the sulfuric medium into a violet coloring agent.

Hydrazin from 1.4 naphtionic acid in the first stage produces the leuco base of a green coloring-matter, and in the second stage this leuco base becomes transformed into a deep-blue coloring substance of the shade known as "Nicholson blue."

Example 1. Phenylhydrazin, one hundred and eight parts, and tetramethyldiamidobenzhydrol, two hundred and seventy parts, are dissolved cold in ten parts of concentrated sulfuric acid and heated for about half an hour to from 60° to 70° centigrade. The hydrol disappears, the sulfuric solution assumes an olive color, and the leuco base is formed. Heating is now continued until the temperature is raised from 10° to 20° centigrade, when the sulfuric solution will change to a brown color, and a short time—say about an hour and a half—after this the leuco base, which was originally oxidizable to a greenish blue, will have changed to a violet color. This product is insoluble in water and in alkalies and readily separates by neutralization from the sulfuric solution diluted in water. It is soluble in hot diluted acetic acid, changing to a reddish violet. In diluted mineral acids it changes to a light yellow; in alcohol, to violet; in ether, benzin, and ligroin it is insoluble. It is precipitated from its cold hydrochloric or sulfuric solutions by means of acetate of soda. It will dye wool a violet color over a slightly-acid bath.

Example 2. By substituting one hundred and ninety grams of parasulfophenylhydrazin for the phenylhydrazin in the foregoing example and operating under the same conditions as before a rather more bluish violet—not unlike that of the first example on the whole—will be obtained; but this will be found soluble in diluted caustic alkalies without undergoing any discoloration. It is separated from its sulfuric solution by being neutralized with carbonate of soda. It will dye wool a bluish violet over a slightly-acid bath.

Example 3. By substituting one hundred and twenty-two grams of methylphenylhydrazin for the phenylhydrazin instanced in example No. 1 there will be obtained under the same conditions a more reddish violet than that of the preceding example, but having similar properties in other respects. It will dye wool a reddish violate in a slightly-acid bath.

Example 4. If in No. 1 example ethylphenylhydrazin be substituted for phenylhydrazin the result will be a violet color similar to that obtained from methylhydrazin.

Example 5. By substituting one hundred and eighty-two grams of diphenylhydrazin for the phenylhydrazin of No. 1 example a blue coloring substance will be obtained which is insoluble in water and alkalies, but soluble in alcohol and dilute acids and also soluble in hot dilute acetic, where it will turn blue. It will impart a blue shade to wool.

Example 6. By substituting two hundred and thirty-seven grams of 1. 4 sulfonaphthylhydrazin for the phenylhydrazin of example No. 1 a blue coloring agent will be obtained which is insoluble in alkalies, but soluble to a true blue in dilute acetic acid; into light yellow in dilute mineral acids; into blue in alcohol. It is insoluble also in benzin, ether, and ligroin and may be precipitated from its dilute sulfuric and hydrochloric solutions by means of acetate of soda. It will dye wool a deep and bright blue over an acetic bath and a somewhat more greenish blue over a slightly-sulfuric bath. The dyes it gives offer a certain amount of resistance to alkalies.

Example 7. If three hundred and seventeen grams of bi-sulfo alpha-naphthylhydrazin (a derivative from Dahl's acid mixtures II and III) for the phenylhydrazin of No. 1 a blue dyestuff of a rather more greenish shade than that of the preceding example and of the same degree of solubility will be obtained.

It is to be noted that in the naphthalene series the presence of the $SO_3H$ group appears to assist the reaction. Alpha-naphthylhydrazin will only partially change to a bluish-green coloring-matter, while beta-naphthylhydrazin somewhat more readily turns into a green dyestuff. Also, in all the examples above given the tetra methyl diamido benzhydrol may be replaced by its tetra ethyl homologue without making any change in the conditions under which the operation is carried on. The corresponding products are similar to those described above in nature, shade of coloring, and properties.

I claim—

1. The process herein described of producing violet and blue coloring-matters by condensation of tetralkyl hydrols with aromatic hydrazins at from 60° to 80° centigrade, the action being prolonged until the leuco base, appearing in the first phase, becomes transformed into coloring-matter, as set forth.

2. The described coloring-matters derived by condensation in sulfuric acid of tetralkyl hydrols with aromatic hydrazins, said products being distinguished by a violet or blue color, by the property of dyeing animal fiber, by insolubility in water and alkalies, and general solubility in mineral acids and alcohol, as set forth.

In testimony whereof I have signed this specification in the presence of two subscribing witnesses.

HENRI RAYMOND VIDAL.

Witnesses:
EDWARD P. MACLEAN,
JULES ALPHONSE GUSTAVE TOURNET.